(12) United States Patent
Severns

(10) Patent No.: US 6,207,024 B1
(45) Date of Patent: Mar. 27, 2001

(54) METHOD OF PREPARING PHOSPHORUS

(75) Inventor: Richard R. Severns, Kemmerer, WY (US)

(73) Assignee: Astaris LLC, St. Louis, MO (US)

( * ) Notice: Subject to any disclaimer, the term of this patent is extended or adjusted under 35 U.S.C. 154(b) by 0 days.

(21) Appl. No.: 09/412,774

(22) Filed: Oct. 4, 1999

(51) Int. Cl.$^7$ .................................................. C01B 25/00
(52) U.S. Cl. ................................ 204/157.43; 204/157.45
(58) Field of Search ........................... 204/157.43, 157.45

(56) References Cited

U.S. PATENT DOCUMENTS

| 171,813 | 1/1876 | Hunter | 423/322 |
|---|---|---|---|
| 4,321,089 | 3/1982 | Kruesi et al. | 75/84.5 |
| 4,324,582 | 4/1982 | Krues et al. | 75/1 R |
| 4,435,374 | 3/1984 | Helm, Jr. | 423/415 |
| 4,935,114 | 6/1990 | Varma | 204/157.43 |
| 5,269,892 | 12/1993 | Cha | 204/157.3 |
| 5,362,451 | 11/1994 | Cha | 422/186.3 |
| 5,451,302 | 9/1995 | Cha | 204/157.13 |

FOREIGN PATENT DOCUMENTS

| 1102399 | 11/1993 | (CN) . |
|---|---|---|
| 9612043 | 4/1996 | (WO) . |

*Primary Examiner*—Edna Wong
(74) *Attorney, Agent, or Firm*—Thompson & Coburn LLP; Paul A. Lesko

(57) ABSTRACT

A method of producing phosphorus in which a mixture of phosphoric acid and carbon reductant is exposed to microwaves at a power level sufficient to heat the mixture to a temperature at which phosphorous is produced. This method can be carried out at lower temperatures than conventional phosphorous production and does not give rise to the solid waste normally formed in conventional phosphorous production. The phosphorus thus formed can be converted back to phosphoric acid, thus effecting purification of the phosphoric acid.

22 Claims, 1 Drawing Sheet

METHOD OF PREPARING PHOSPHORUS

FIELD OF THE INVENTION

This invention relates to the production of elemental phosphorus by the carbonaceous reduction of phosphoric acid. More particularly, the invention pertains to a method of producing phosphorous that does not produce the solid waste normally formed in conventional phosphorous production.

BACKGROUND OF THE INVENTION

In the commercial preparation of phosphorus, a mixture of calcium phosphate usually as phosphate shale; carbon, such as coke; and sand (silica, $SiO_2$) flux is charged into an electric furnace and the contents heated to melting temperatures, generally about 3000° F. (about 1650° C.). The phosphate is reduced by the carbon reductant to elemental phosphorus, which is evolved as a vapor from the molten reaction mass. The vapor is conveyed to a cooling zone and condensed. Molten slag is drawn off through an outlet at the bottom of the furnace. Also drawn off through a lower tap hole is the dense, metallic like ferrophosphorous, an alloy of phosphorus, iron and other heavy metals.

Although the electric furnace process of smelting phosphate rock to obtain phosphorus has been carried out for a number of years, it has several disadvantages. Chief among these are the high consumption of electric power and the generation of slag waste products that require safe handling and disposal. In some installations, specially prepared briquettes of hardened carbon reductant and phosphate shale are used in formulating the furnace feed materials. Such items together with the expensive electrode equipped furnaces contribute further to plant and operating costs.

Depending on the source of the phosphate ore and the refining conditions, elemental phosphorous produced by the electric furnace process typically contains parts per million quantities of one or more heavy metals, such as zinc, chromium, arsenic, and antimony. These metals can be carried over when the phosphorous is converted to phosphoric acid, making the acid unacceptable in certain high value applications, such as in food and in semiconductor applications. Removal of these metals from the phosphorous before it is converted to phosphoric acid typically requires expensive purification processes, which may not be economical if high levels of these metals are present.

Phosphoric acid can be produced directly by addition of an acid, such as sulfuric acid, to phosphate rock. Although the composition of the resulting acid, known as "wet phosphoric acid", varies with the composition of the phosphate rock, the acid is typically impure and not suitable for food grade and for semiconductor applications. The acid typically contains high levels of fluoride and other materials, such as iron and aluminum, that must be removed by extensive purification processes before the acid is suitable for these high value applications.

Thus, a need exists for a method of preparing phosphorous that does not produce large amounts of slag and which produces phosphorous that does not contain large amounts of heavy metal contaminants as well as for a method for preparing phosphoric acid suitable for food grade and other high value applications that does not require extensive purification.

SUMMARY OF THE INVENTION

The invention is a method of preparing elemental phosphorus by the carbonaceous reduction of an phosphoric acid. The method includes the steps of:

(a) heating a mixture of phosphoric acid and a particulate carbon reductant with microwave radiation in a non-oxidizing atmosphere;

(b) evolving a phosphorous vapor from the mixture; and (c) condensing the phosphorous vapor to form condensed elemental phosphorus.

During the reaction, the power level of the microwave radiation is adjusted to heat the mixture to a reducing temperature as evidenced by evolution of the phosphorous vapor. A preferred carbon reductant is pyrolytic carbon, more preferably pyrolytic carbon with an internal surface area of at least 50 $m^2/g$, most preferably calcinate.

Reduction of a phosphoric acid to produce phosphorus by microwave heating can be effected at a much lower temperature than by the direct heating used in the electric furnace process. Because phosphoric acid is used as the source of phosphorous, the other products of the reaction are gases. Consequently, the method produces little or no solid waste (slag) requiring disposal.

In another aspect of the invention, purified phosphoric acid is produced from the elemental phosphorus prepared as described above.

DETAILED DESCRIPTION OF THE INVENTION

Figure 1:
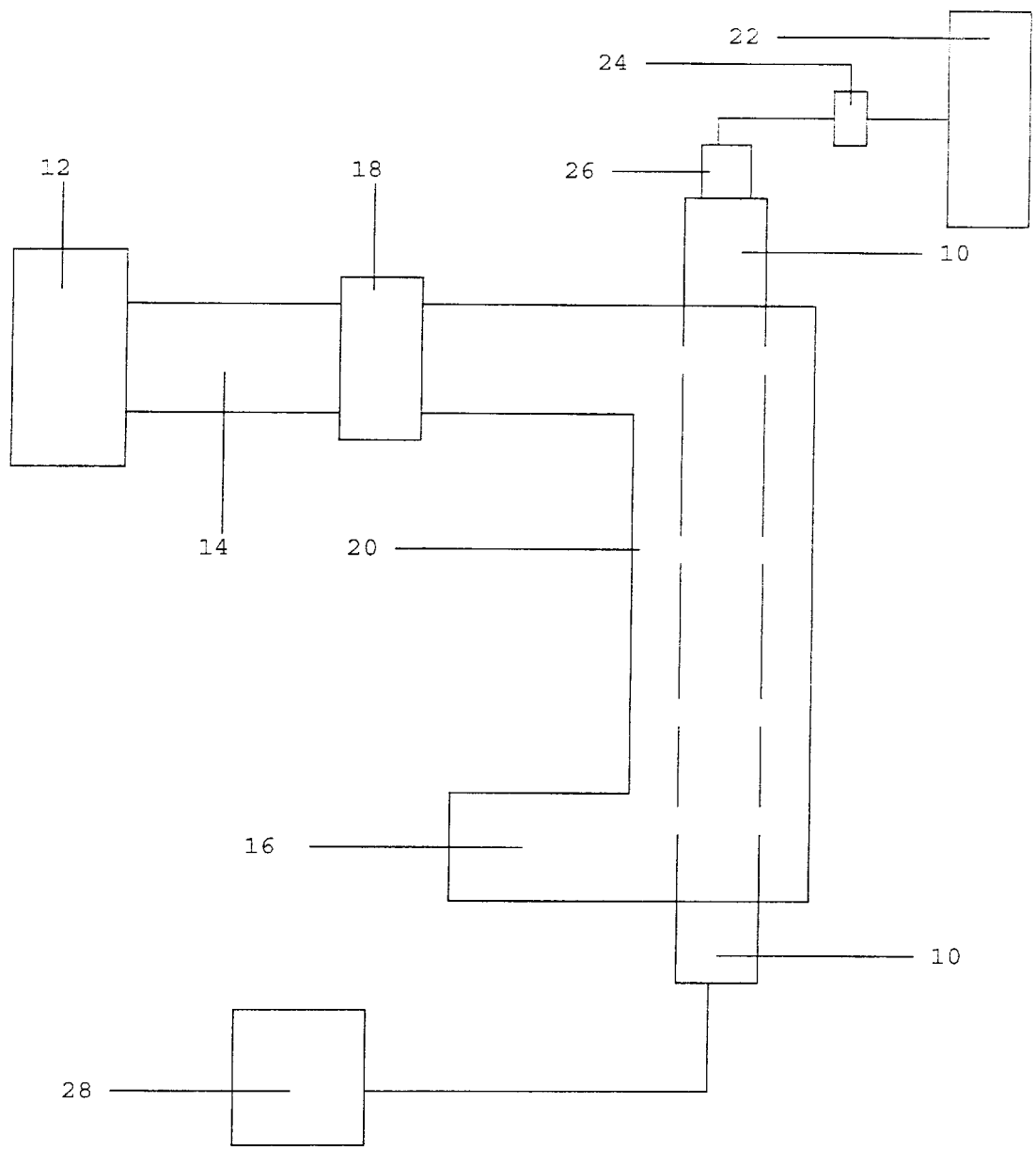
FIG. 1 shows the basic components used in carrying out the method of the invention.

The reduction of phosphoric acid with carbon to produce phosphorus is known. For example, Hunter, U.S. Pat. No. 171,813, discloses formation of phosphorous from reaction of phosphoric acid and carbon heated to white hot temperatures (about 2500–2700° F.; about 1370–1480° C.). However, the reduction of phosphate with carbon in a microwave field to prepare phosphorus has been found to occur at unexpectedly low temperature, below about 1000° F. (about 540° C.). This compares to the approximately 3000° F. (about 1650° C.) of the electric furnace process and the white hot temperature of Hunter.

Reduction of phosphoric acid is believed to be represented following overall reaction:

$$4H_3PO_4 + 16C \rightarrow 6H_2 + 16CO + P_4 \qquad (1)$$

Phosphoric acid typically contains some water. Water is reduced to hydrogen and carbon monoxide, as represented by the following overall reaction (see, Helm, Jr., U.S. Pat. No. 4,435,374):

$$H_2O + C \rightarrow H_2 + CO \qquad (2)$$

The method is essentially slag-free. The amount of slag produced depends on the amount of mineral ash present in the carbon reductant. Although the carbon reductant may comprise a small amount of mineral ash, the method typically produces only about 2% or less of the solid waste produced by the electric furnace process. The mineral ash is typically not converted to slag during the method because the phosphoric acid/carbon reductant mixture is not heated to a slag-forming temperature (i.e., the mixture is heated to a temperature below a slag-forming temperature). Slag forms at temperatures in the range of over about 2000° F. (about 1100° C.). The reaction temperature is typically about 800–1200° F. (about 430–650° C.). Higher temperatures presumably could be used, but larger amounts of energy would be required to heat the mixture to these temperatures.

Slag comprises primarily oxides of calcium, silicon, and aluminum. Slag formers, which typically amount to about 70% of the total feed in the electric furnace process, are heated to about 2500–3000° F. (1370–1650° C.) during the process. Because slag formers are not added to the reactor in the method of this invention, the electrical energy required to heat these materials is saved.

The use of microwaves to bring about chemical reactions has been described. For example, Cha, U.S. Pat. No. 5,269,892, incorporated herein by reference, describes the use of microwaves to remove oxide gases from gas streams. Helm, Jr., U.S. Pat. No. 4,435,374, incorporated herein by reference, describes coal gasification using microwave energy. Cha, U.S. Pat. No. 5,451,302, incorporated herein by reference, describes concentration of phosphoric acid by removal of bound water using microwave energy. Cha, U.S. Pat. No. 5,269,892, column 2, line 23, to column 3, line 19, summarizes a number of disclosures in the field.

FIG. 1 shows the basic components used in carrying out the method of the invention. These include reactor 10; microwave generator 12; couplers 14 and 16; impedance-matching device (tuner) 18; waveguide 20; non-oxidizing gas source 22; flow meter 24; gas inlet 26; and phosphorous recovery system 28. Microwave apparatus and devices, i.e., microwave generators, directional couplers, tuners, and waveguides are well-known in the art of microwave heating. See, for example, "Microwave Technology," in *Kirk-Othmer Encyclopedia of Chemical Technology,* 3rd. Ed., Vol. 15, pp. 494–517, and *Microwave Principles and Systems,* N. Cook, Prentice-Hall, New York, 1986.

Referring to FIG. 1, reactor 10 may be of any convenient shape, such as substantially cylindrical, provided the phosphoric acid/carbon reductant mixture can be readily packed therein. At least a portion of the reactor may be transparent to microwave radiation. Alternatively, if the entire reactor is made of a material that is not transparent to microwave radiation, the reactor wall or walls are penetrated by one or more waveguides that transport microwave energy into reactor 10.

Quartz has high transmission of the 2450 MHz wavelength and can be used as the material for the reactor. Other materials useful for forming the reactor include, for example: glass, fire clay, mineral refractories, and ceramic dielectrics, typically materials with complex $TiO_x$ and $SiO_x$ structures. Other materials may be used to form the reactor if the material is able to withstand exposure to the temperatures required for the reaction, to acidic atmospheres, and to phosphorous vapor.

Microwave generator 12 provides variable power in the microwave range. Microwaves are generally defined as that segment of the electromagnetic spectrum ranging from 300 MHz (megahertz) to 300 GHz (gigahertz) although a more narrow band, 915–5000 MHz, is commonly employed for heating. No particular microwave frequency is required for the reaction; the range of 915–5000 MHz can be used in the method. However, common heating frequencies are 915 MHz and 2450 MHz. The former frequency is often used in industrial heating applications; the latter is the frequency of household microwave ovens because it is a good frequency for exciting water molecules. Consequently, generators of these frequencies are common and readily available.

Microwave generators, such as continuous-wave magnetrons, are well known to those skilled in the art. The size of the generator and amount of microwave power provided depends on the desired capacity of the apparatus. Multiple sources, such as a ring of magnetrons, may be used, if required. The power level of the microwave radiation is adjusted to heat the phosphoric acid/carbon reductant mixture to the reducing temperature, as evidenced by evolution of the phosphorus vapor.

To minimize microwave losses, the microwave energy output is matched to the impedance of the phosphate/carbon reductant absorbing material so that the effective microwave power is transferred to the absorbing material. The load impedance of reactor 10 is matched to the impedance of microwave generator 12 by tuner 18 minimizing the reflected power (and maximizing the forward power) as indicted by the couplers 14 and 16. This is referred to as "impedance match." If an impedance match is not attained, the absorbing material reflects a portion of the energy. As the material inside the reactor heats up, its dielectric properties change, causing the load impedance to change with time. Tuner 18 is adjusted to compensate for this change. Although necessary for a laboratory scale apparatus, tuning may be unnecessary in commercial-sized units because the larger sized reaction chamber reflects the microwaves until they are absorbed within the reactor.

The reaction is carried out in a non-oxidizing atmosphere, i.e., an inert or reducing atmosphere. A non-oxidizing atmosphere can be conveniently provided by a flow of a reducing gas, such as carbon monoxide, or an inert gas, such as nitrogen or argon, through reactor 10. A preferred non-oxidizing gas is nitrogen. Non-oxidizing gas from gas source 22 enters reactor 10 by way of gas inlet 26. The flow of gas is controlled by flow meter 24. The gas flow sweeps the phosphorous vapor along with emitted gases from the reactor into phosphorous recovery system 28. The gas source is typically a cylinder of compressed gas or, in the case of nitrogen, a liquid nitrogen storage facility. When the method is carried out on a large scale, the carbon monoxide emitted by the method may be cleaned and used as a non-oxidizing atmosphere, thus reducing the requirements for nitrogen gas.

The phosphorous is recovered from the emitted gases by phosphorous recovery system 28. A conventional recovery system, such as is used in the electric furnace process of phosphorous production, may be used. However, precipitators, which are used to remove the particulate material formed in the electric furnace process, typically are not required unless the gas flow carries over some of the ash or carbon particles. The gaseous mixture containing phosphorous vapor produced by the reactor is introduced into one or more spray condensers in which sufficient water is introduced by overhead spray heads to reduce the temperature of the gas below the dew point but above the freezing point (about 44.1° C.) of phosphorous. The phosphorous vapor condenses to liquid globules of phosphorous, which fall to the bottom and coalesce to a layer of liquid phosphorous.

Elemental phosphorous reacts spontaneously with air. Because water is immiscible with, and less dense than, phosphorous, water forms a protective layer above the phosphorous. The water layer serves as an effective, economical interface that prevents contact between phosphorous and air. The phosphorous can be recovered and processed using conventional phosphorous handling techniques.

Various carbons, especially pyrolytic carbons such as coal and petroleum cokes in particulate form, are suitable for use as the carbon reductant. Pyrolytic carbon refers any carbonaceous material that has been treated by the application or action of heat. Particle size of the coke particles can range from about 10 microns to 50 mm, preferably about 0.1 to 25 mm, more preferably about 1 to 5 mm. Pyrolytic carbon is an excellent absorber of microwave radiation. A preferred pyrolytic carbon reductant is the coal-derived char obtained by the fluid bed pyrolysis of coal particles as described in Work, U.S. Pat. No. 3,140,241, incorporated herein by reference. The char, sometimes known as "calcinate", is a reactive form of carbon and is free of tars and other condensables. It has small micropores in its structure resulting in an internal surface area of about 50–200 $m^2/g$. (Conventional coke, for example, has an internal surface area of about 1–2 $m^2/g$. Activated carbon has an internal surface area of about 1000 $m^2/g$)

An excess of carbon reductant of from about 10% to 200% above that needed to satisfy the stoichiometry is normally used. A typical excess is about 100%.

Phosphoric acid is obtainable in a variety of concentrations and grades. It is most commonly produced as 75% phosphoric acid (equivalent to 45% $P_2O_5$) although higher concentrations are available. Nominal concentrations above 100% can be made by increasing the "Wet phosphoric acid" is derived from the digestion of phosphate rock with sulfuric acid using methods well known to those skilled in the art (see, for example, "Phosphoric Acid and Phosphates", in *Encyclopedia of Chemical Processing and Design,* Vol. 35, J. J. McKetta, Ed., Dekker, New York, 1990). "Green acid" is derived from phosphate rock that has been calcined prior to acidification. "Black acid" is derived from phosphate rock that has not been calcined prior to acidification and typically contains more impurities than green acid. These acids are typically concentrated to the desired concentration by evaporation of water.

The phosphoric acid and the carbon reductant are typically mixed before they are placed in the reactor to from the phosphoric acid/carbon reductant mixture, but mixing before addition to the reactor is not essential.

Impure or crude phosphoric acid, such as "green acid" and "black acid," can be refined or purified by subjecting the acid to the method of the invention to form phosphorous, burning the phosphorus so formed in a phosphorous burner, and hydrating the resulting $P_2O_5$ to provide phosphoric acid of the desired strength and quality using conventional processes for converting elemental phosphorous to phosphoric acid. These processes are well-known to those skilled in the art and are described in numerous texts and articles (see, for example, "Phosphoric Acid and Phosphates", in *Encyclopedia of Chemical Processing and Design,* Vol. 35, J. J. McKetta, Ed., Dekker, New York, 1990).

The method can be operated in either batch or continuous mode. In a batch mode, phosphoric acid and char are mixed and the mixture placed in the reactor. The flow of gas is started, and the appropriate amount of microwave power applied until the calculated amount of phosphorous has been produced and/or evolution of phosphorous ceases. The excess char is then removed from the reactor and the method repeated. The excess char can be separated and used as "activated carbon" or it can be recycled to the reactor after removal of the particulate ash.

In the continuous mode, the mixture of char and phosphoric acid is added to the top of the reactor. Alternatively, char and phosphoric acid are added to the reactor separately. For a large reactor, the phosphoric acid is injected from multiple injection sites, preferably located just above the hottest part of the reactor. Excess carbon and ash are continuously removed from the bottom of the reactor using a double air lock. As noted above, the excess char can be separated and used as "activated carbon" or it can be recycled to the reactor after removal of the particulate ash.

Should any of the mineral ash present in the carbon be carried out of the reactor with the phosphorous vapor by the gas stream, it can be removed from the gas stream by inclusion of a scrubber or precipitator in the phosphorous recovery system.

INDUSTRIAL APPLICABILITY

The method can be used to prepare phosphorous from phosphoric acid. Because phosphoric acid, rather than phosphate rock is used as the source of phosphorous, the method produces little of no solid waste. The reaction can be effected at a much lower temperature than by the direct heating used in the electric furnace process, producing a large saving in energy.

The advantageous properties of this invention can be observed by reference to the following examples which illustrate but do not limit the invention.

EXAMPLES

Apparatus

The microwave reduction of phosphoric acid to phosphorous was carried out on a laboratory scale. The microwave generator provided variable power up to 3000 watts at a frequency of 2450 MHz. The reactor, a quartz tube 16 mm inside diameter and 610 mm in length, was placed in the H-bend waveguide. The load impedance of the reactor was matched to the microwave generator impedance by a tuner in order to minimize the reflected power and maximize the forward power as indicated by the directional coupler. To measure the microwave energy applied, reflected and absorbed by the method, three power meters were used. As the material inside the reactor absorbed microwave energy, its dielectric properties changed, causing the load impedance to change with time. The tuner was adjusted to compensate this change. The walls of the quartz tube are transparent to the 2450 MHz microwaves, whereas the char (carbon reductant) inside the tube absorbs the radiation and is heated thereby.

Two flow meters were used, one to measure the inert gas flow rate and the other to monitor the reactor gas flow rate. A water bath placed at the reactor outlet trapped and condensed the phosphorus vapor formed by reduction of the phosphate and carried by the outlet gas. The quartz reactor outlet was packed with glass cotton to hold the char in place.

Example 1

This Example illustrates the reduction of 86% phosphoric acid to phosphorous.

Prior to use, char was placed in the reactor and heated with 550 watts of microwave power for 2 hr to remove any residual volatiles. A nitrogen purge of 200 $cm^3/min$ was maintained through the reactor.

The char was the coal-derived char produced by the fluid bed pyrolysis of coal particles as described in Work, U.S. Pat. No. 3,140,241. The particle size distribution is shown in the following table, which indicates the amount of material, by weight, that did not pass through increasingly smaller screens. Part of the material (8.1%) passed through the smallest screen.

| Mesh Size | Sieve opening (mm) | Cumulative Percent |
| --- | --- | --- |
| +6 Mesh | 3.36 | 0.1 |
| +8 Mesh | 2.38 | 0.2 |
| +10 Mesh | 2.00 | 8.5 |
| +14 Mesh | 1.41 | 18.8 |
| +28 Mesh | 0.589 | 39.9 |
| +48 Mesh | 0.295 | 60.0 |
| +65 Mesh | 0.208 | 67.0 |
| +100 Mesh | 0.149 | 75.0 |
| +200 Mesh | 0.074 | 86.1 |
| +325 Mesh | 0.044 | 91.9 |

Char (20 g) and 86% phosphoric acid (5.0 g, equivalent to 43.9 mmol of acid and 38.3 mmol of water) were thoroughly mixed and placed in the quartz reactor tube of the microwave generating apparatus. Microwave power was applied to the reactor for a period of 2 hr. Nitrogen gas at a rate of 500 cm³/min was passed through the reactor during exposure. The temperature of the reactor contents during treatment was estimated to be about 600° C. Phosphorus vapor was condensed in a water bath located at the outlet of the reactor. Following the reaction, the weight loss of the acid containing char was determined.

The amount of phosphorous produced was estimated from the measured weight loss, assuming that the water was vaporized by microwave heating before it could react with the carbon and that the phosphorous is formed according to Equation 1. Samples were evaluated using various microwave power levels. The results are summarized in Table 1.

TABLE 1

| Microwave Power (W) | 86% Acid Added (g) | Weight loss in 2 hr (g) | Conversion (%) |
| --- | --- | --- | --- |
| 500 | 5 | 2.4 | 26 |
| 600 | 5 | 2.8 | 33 |
| 700 | 5 | 3.6 | 45 |
| 800 | 5 | 3.3[a] | 40 |
| 900 | 5 | 4.1 | 53 |
| 1000 | 5 | 4.4 | 58 |

[a]Suspected error.

Example 2

This Example illustrates the reduction of green acid to phosphorous. The procedure of Example 1 was repeated except that green acid was substituted for 86% phosphoric acid. Because green acid may vary in composition and water content, the stoichiometry is based on the $P_2O_5$ assay (70%, equivalent to 96.6% phosphoric acid) of the crude acid.

In these experiments, the reactor outlet was plugged with 4 in (about 10 cm) of glass cotton. This allowed the evolved phosphorus to be deposited in the reactor. Green acid (10 g; equivalent to 0.0493 mol of $P_2O_5$ and 0.1667 mol of water) was fed into the reactor. Following the reaction, the weight loss of the acid containing char was determined.

The amount of phosphorous produced was estimated from the measured weight loss as in Example 1. Samples were evaluated using various microwave power levels. The results are summarized in Table 1.

TABLE 2

| Microwave Power (W) | Green Acid Added (g) | Weight loss in 2 hr (g) | Conversion (%) |
| --- | --- | --- | --- |
| 500 | 10 | 3.4 | 24 |
| 700 | 10 | 4.2 | 29 |
| 900 | 10 | 5.5 | 39 |

Having described the invention, I now claim the following and their equivalents.

What is claimed is:

1. A method of preparing elemental phosphorus, the method comprising:
   (a) heating a mixture of phosphoric acid and a particulate carbon reductant with microwave radiation in a non-oxidizing atmosphere;
   (b) evolving a phosphorous vapor from the mixture; and
   (c) condensing the phosphorous vapor to form condensed elemental phosphorus.

2. The method of claim 1 in which the mixture is heated to a temperature below a slag-forming temperature.

3. The method of claim 2 in which the temperature is about 430° C. to about 650° C.

4. The method of claim 1 in which the carbon reductant has an internal surface area of at least 50 m²/g.

5. The method of claim 4 in which the mixture is heated to a temperature below a slag-forming temperature.

6. The method of claim 5 in which the temperature is about 430° C. to about 650° C.

7. The method of claim 6 in which the carbon reductant is pyrolytic carbon.

8. The method of claim 1 in which the carbon reductant is calcinate.

9. The method of claim 1 in which the carbon reductant is pyrolytic carbon.

10. The method of claim 9 in which the mixture is heated to a temperature below a slag-forming temperature.

11. The method of claim 10 in which the temperature is about 430° C. to about 650° C.

12. The method of claim 1 additionally comprising, before step (a), the step of adding sulfuric acid to phosphate rock to form the phosphoric acid.

13. The method of claim 12 in which the carbon reductant has an internal surface area of at least 50 m²/g and in which the mixture is heated to a temperature below a slag-forming temperature.

14. The method of claim 1 in which the microwave frequency is either 915 MHz or 2450 MHz.

15. A method of preparing purified phosphoric acid, the method comprising:
   (a) heating a mixture of impure phosphoric acid and a particulate carbon reductant with microwave radiation in a non-oxidizing atmosphere;
   (b) evolving a phosphorous vapor from the mixture;
   (c) condensing the phosphorous vapor to form condensed elemental phosphorus;
   (d) recovering the elemental phosphorous; and
   (e) converting the elemental phosphorous to the phosphoric acid.

16. The method of claim 15 in which the mixture is heated to a temperature below a slag-forming temperature.

17. The method of claim 16 in which the temperature is about 430° C. to about 650° C.

18. The method of claim 15 in which the carbon reductant has an internal surface area of at least 50 m²/g.

19. The method of claim 18 in which the mixture is heated to a temperature below a slag-forming temperature.

20. The method of claim 19 in which the temperature is about 430° C. to about 650° C.

21. The method of claim 15 in which the carbon reductant is pyrolytic carbon.

22. The method of claim 15 in which the carbon reductant is calcinate.

* * * * *